United States Patent
Park et al.

(10) Patent No.: US 8,926,915 B2
(45) Date of Patent: Jan. 6, 2015

(54) SMELL-DIFFUSING CELL ARRAY SUBSTRATE, APPARATUS FOR TRANSFERRING SMELL INFORMATION AND ELECTRONIC DEVICE INCLUDING THE APPARATUS

(75) Inventors: Jong-jin Park, Hwaseong-si (KR); Seung-nam Cha, Seoul (KR); Jae-hyun Hur, Sengnam-si (KR); Jong-min Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 601 days.

(21) Appl. No.: 12/801,889

(22) Filed: Jun. 30, 2010

(65) Prior Publication Data
US 2011/0217211 A1    Sep. 8, 2011

(30) Foreign Application Priority Data
Mar. 5, 2010 (KR) .................. 10-2010-0020070

(51) Int. Cl.
| B01J 19/08 | (2006.01) |
| B01J 19/00 | (2006.01) |
| B01J 19/12 | (2006.01) |

(52) U.S. Cl.
CPC . *B01J 19/00* (2013.01); *B01J 19/12* (2013.01)
USPC ............... 422/186.3; 210/748.01; 210/748.1; 210/748.14; 424/401; 502/103

(58) Field of Classification Search
CPC ........... B01J 19/00; B01J 19/12; B01J 13/22; A61K 8/11; A61Q 13/00
USPC ......... 422/186.3; 201/748.01, 748.1, 748.14; 502/103; 424/401
See application file for complete search history.

(56) References Cited

U.S. PATENT DOCUMENTS

| 5,411,398 | A | 5/1995 | Nakanishi et al. |
| 5,574,372 | A | 11/1996 | Moritz et al. |
| 6,068,600 | A | 5/2000 | Johnson et al. |
| 6,106,946 | A | 8/2000 | Tanaka et al. |
| 6,299,972 | B1 | 10/2001 | Iwasaki et al. |
| 6,599,234 | B1 | 7/2003 | Gray et al. |
| 6,727,881 | B1 | 4/2004 | Albert et al. |
| 6,738,050 | B2 | 5/2004 | Comiskey et al. |
| 6,870,661 | B2 | 3/2005 | Pullen et al. |
| 6,876,143 | B2 | 4/2005 | Daniels |
| 7,027,030 | B2 | 4/2006 | Kanno |
| 7,309,500 | B2 | 12/2007 | Kim et al. |
| 2006/0039934 | A1* | 2/2006 | Ness et al. .................. 424/401 |
| 2007/0206154 | A1 | 9/2007 | Brady |
| 2008/0164960 | A1 | 7/2008 | Schnell et al. |
| 2008/0164963 | A1 | 7/2008 | Tominaga et al. |
| 2008/0180308 | A1 | 7/2008 | Okada et al. |

FOREIGN PATENT DOCUMENTS

| JP | 09-186949 | 7/1997 |
| JP | 2006-247621 | * 9/2012 |

(Continued)

*Primary Examiner* — Xiuyu Tai
(74) *Attorney, Agent, or Firm* — Harness, Dickey & Pierce, P.L.C.

(57) ABSTRACT

A smell-diffusing cell array substrate, an apparatus configured to transfer smell information and an electronic device are provided, the smell-diffusing cell array substrate includes at least one smell-diffusing cell having a microcapsule with a core-shell structure. A shell of the microcapsule includes a wall material and a photocatalyst dispersed in the wall material. A core of the microcapsule includes a smell-diffusion material and a hydrophilic liquid.

16 Claims, 6 Drawing Sheets

(56) References Cited

FOREIGN PATENT DOCUMENTS

| KR | 20-0248661 | 11/2001 |
| KR | 10-0458857 | 12/2004 |
| KR | 10-0499588 | 7/2005 |
| KR | 20-0393995 | 8/2005 |
| KR | 20-0424070 | 8/2006 |
| KR | 10-0623932 | 9/2006 |
| KR | 10-2009-007520 | 1/2009 |

* cited by examiner

SMELL-DIFFUSING CELL ARRAY SUBSTRATE, APPARATUS FOR TRANSFERRING SMELL INFORMATION AND ELECTRONIC DEVICE INCLUDING THE APPARATUS

CROSS-REFERENCE TO RELATED APPLICATIONS

This application claims the benefit of priority under 35 U.S.C. §119 from Korean Patent Application No. 10-2010-0020070, filed on Mar. 5, 2010, in the Korean Intellectual Property Office, the disclosure of which is incorporated herein in its entirety by reference.

BACKGROUND

1. Field

Example embodiments relate to a smell-diffusing cell array substrate, an apparatus for transferring smell information, and an electronic device. Other example embodiments relate to a smell-diffusing cell array substrate including at least one smell-diffusing cell having a microcapsule with a core-shell structure and diffusing smell when exposed to UV rays, an apparatus including the smell-diffusing cell array substrate, and an electronic device including an apparatus for transferring smell information.

2. Description of the Related Art

Information transferable by broadcasting, wire/wireless phones, telecommunication devices, internet and off-line advertisement media is limited to sounds and images. There is a need to transfer smell information with, or without, sounds and images in various fields in order to increase the sense of realism.

SUMMARY

Example embodiments relate to a smell-diffusing cell array substrate, an apparatus for transferring smell information, and an electronic device. Other example embodiments relate to a smell-diffusing cell array substrate including at least one smell-diffusing cell having a microcapsule with a core-shell structure and diffusing smell when exposed to UV rays, an apparatus including the smell-diffusing cell array substrate, and an electronic device including an apparatus for transferring smell information.

Provided is a smell-diffusing cell array substrate including at least one smell-diffusing cell that includes a microcapsule having a core-shell structure and diffusing smell when exposed to UV rays.

Provided is an apparatus for transferring smell information, the apparatus including the smell-diffusing cell array substrate.

Provided is an electronic device including the apparatus for transferring smell information.

Additional aspects will be set forth in part in the description which follows and, in part, will be apparent from the description, or may be learned by practice of the presented embodiments.

According to example embodiments, a smell-diffusing cell array substrate includes at least one smell-diffusing cell that includes a microcapsule having a core-shell structure, wherein a shell of the microcapsule includes a wall material and a photocatalyst dispersed in the wall material, and a core of the microcapsule includes a smell-diffusion material and a hydrophilic liquid.

The wall material may include at least one selected from the group consisting of a metal, an inorganic material, an organic material and combinations thereof.

The wall material may include at least one selected from the group consisting of gold, silver, silicon derivatives, protein, polyphosphate, polysaccharide, gum Arabic, alginate, chitosan, carrageenan, pectin, water-soluble polymer, cellulose, cellulose derivatives and combinations thereof.

The photocatalyst may have hydrophilicity that increases as the exposure to UV rays increases, and decreases when the exposure to the UV rays is stopped.

The photocatalyst may include at least one selected from the group consisting of titanium oxide, zirconium oxide, zinc oxide, vanadium oxide, tin oxide, and derivatives thereof.

The smell-diffusing material may include at least one selected from the group consisting of a low boiling point material, a middle boiling point material, a high boiling point material and combinations thereof.

The smell-diffusing material may include a perfume.

The hydrophilic liquid may include at least one selected from the group consisting of water, alcohols, dimethylformamide, acetone, acetonitrile, chloroform, methylene chloride, N-methylpyrrolidone (NMP) and combinations thereof.

According to example embodiments, an apparatus for transferring smell information may include a smell-diffusing cell array substrate having at least one smell-diffusing cell. The smell-diffusing cell includes a microcapsule having a core-shell structure. The apparatus includes an UV-emitting device disposed at one side of the smell-diffusing cell array substrate to radiate UV rays to the at least one smell-diffusing cell according to an externally input electrical signal. The shell of the microcapsule includes a wall material and a photocatalyst dispersed in the wall material, and the core of the microcapsule includes a smell-diffusing material and a hydrophilic liquid.

The UV-emitting device may include a substrate, a thin film transistor array unit including at least one thin film transistor arrayed on the substrate, a first electrode array unit disposed on the thin film transistor array unit and electrically connected to the thin film transistor array unit, an UV-emitting unit disposed on the first electrode array unit, and a second electrode array unit disposed on the UV-emitting unit.

The UV-emitting unit may include at least one organic light-emitting layer that includes at least one selected from the group consisting of a low molecular weight organic light-emitting diode (OLED) material, a high molecular weight OLED material, a quantum dot (QD) LED material, an inorganic LED material and combinations thereof.

The smell-diffusing cell array substrate may be printed on the second electrode array unit.

The UV-emitting device may include an UV light source, a thin film transistor array substrate exposed to UV rays emitted from the UV light source and including at least one pixel electrode, at least one common electrode disposed on the smell-diffusing cell array substrate so as to face the at least one pixel unit, and a liquid crystal disposed between the thin film transistor array substrate and the at least one common electrode.

The apparatus may further include a protective layer disposed to cover the smell-diffusing cell array substrate.

According to example embodiments, an electronic device includes an apparatus for transferring smell information.

The electronic device may be selected from the group consisting of an image display device, a wire/wireless phone, a computer, a radio, an MP3, a digital multimedia broadcast (DMB), a game machine, a navigator, a mobile telecommunication device or similar devices.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
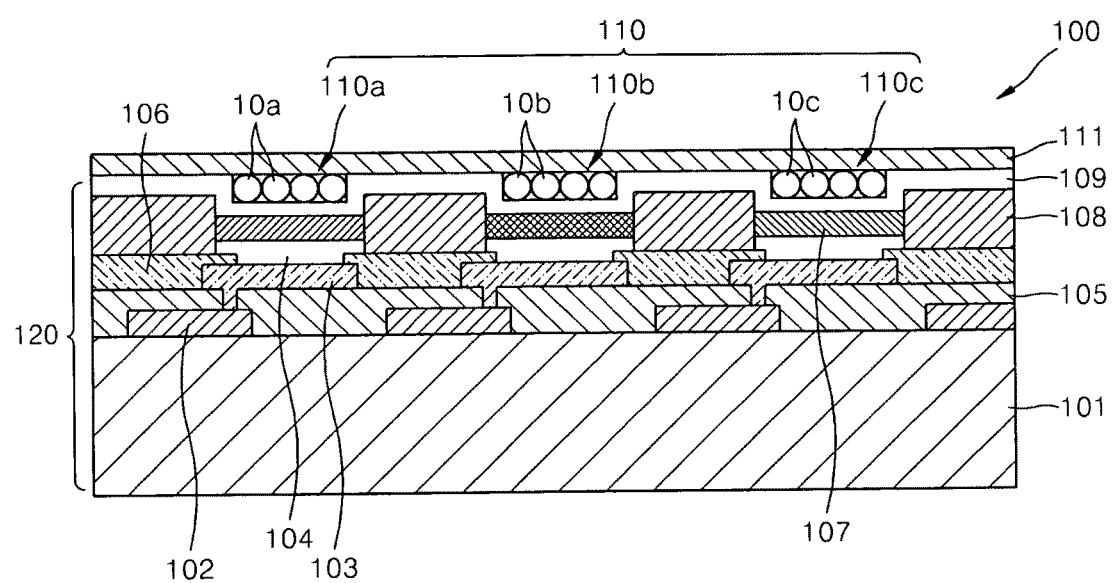
FIG. 1 is a cross-sectional view of an apparatus configured to transfer smell information according to example embodiments.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to example embodiments described.

Example embodiments relate to a smell-diffusing cell array substrate, an apparatus for transferring smell information, and an electronic device. Other example embodiments relate to a smell-diffusing cell array substrate including at least one smell-diffusing cell having a microcapsule with a core-shell structure and diffusing smell when exposed to UV rays, an apparatus including the smell-diffusing cell array substrate, and an electronic device including an apparatus for transferring smell information.

Hereinafter, a smell-diffusing cell array substrate and an apparatus for transferring smell information according to example embodiments will be described in detail with reference to the accompanying drawings.

FIG. 1 is a cross-sectional view of an apparatus configured to transfer smell information according to example embodiments.

Referring to FIG. 1, an apparatus configured to transfer smell information 100 according to example embodiments includes a smell-diffusing cell array substrate 110 and a UV-emitting device 120.

The smell-diffusing cell array substrate 110 may include at least one smell-diffusing cell (e.g., the smell-diffusing cells 110a, 110b and 110c) having at least one microcapsule having a core-shell structure (e.g., the microcapsules 10a, 10b and 10c).

Each of the smell-diffusing cells 110a, 110b and 110c may respectively include at least one microcapsule 10a, at least one microcapsule 10b and at least one microcapsule 10c, respectively. In FIG. 1, three smell-diffusing cells 110a, 110b and 110c are shown for descriptive convenience. However, example embodiments are not limited thereto. For example, the smell-diffusing cell array substrate 110 may include one or two smell-diffusing cells, or four or more smell-diffusing cells.

Figure 6:
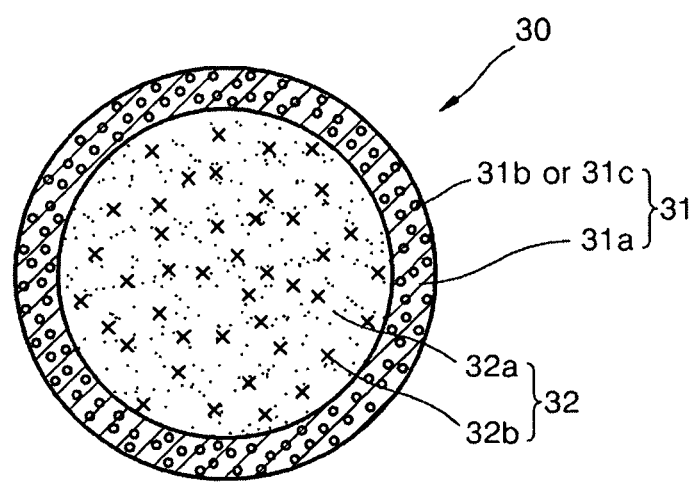
FIG. 6 is a cross-sectional view of a microcapsule of an apparatus configured to transfer smell information according to example embodiments.

FIG. 6 is a cross-sectional view of a microcapsule of an apparatus configured to transfer smell information according to example embodiments.

Referring to FIG. 6, a microcapsule 30 (e.g., the microcapsules 10a, 10b and 10c shown in FIG. 1) includes a shell 31 and a core 32. The shell 31 of the microcapsule 30 may include a wall material (not shown) and a photocatalyst (not shown) dispersed in the wall material. The core 32 of the microcapsule 30 may include a smell-diffusing material (not shown) and a hydrophilic liquid (not shown).

The wall material may include at least one selected from the group consisting of a metal, an inorganic material, an organic material and combinations thereof. The organic material may be a cross-linked polymer. As the degree of cross-linking of the cross-linked polymer increases, the amount of smell diffused from the microcapsules 10a, 10b and 10c decreases. For example, the wall material may include at least one selected from the group consisting of gold, silver, silicon derivatives, protein, polyphosphate, polysaccharide, gum Arabic, alginate, chitosan, carrageenan, pectin, water-soluble polymer, cellulose, cellulose derivatives and combinations thereof.

The photocatalyst may have hydrophilicity that increases as the exposure to UV rays increases, and decreases when the exposure to the UV rays is stopped. When UV rays are radiated to the microcapsule 30, the photocatalyst contained in the shell 31 is dissolved in a hydrophilic liquid to form a crack or hole 31c (not shown) in the shell 31 through which the smell of the smell-diffusing material is diffused. The amount of diffused smell may vary according to the thickness of the shell 31, the type and amount of the wall material, the type and amount of the photocatalyst, the boiling point of the smell-diffusing material, the amount of UV radiation and related factors. When the UV radiation to the microcapsule 30 is stopped, the hydrophilicity of the photocatalyst dissolved in the hydrophilic liquid decreases and the photocatalyst is precipitated. The crack or hole 31c in the shell 31 is at least partially filled with the precipitated photocatalyst. As such, the amount of smell diffused from the smell-diffusing material is reduced, or diffusion is prevented.

The photocatalyst may include at least one selected from the group consisting of titanium oxide, zirconium oxide, zinc oxide, vanadium oxide, tin oxide and derivatives thereof.

The smell-diffusing material may include at least one selected from the group consisting of a low-boiling point material, a middle-boiling point material, a high-boiling point material and combinations thereof. The low-boiling point material may include a material having a boiling point equal to or lower than about 100° C. For example, the low-boiling point material may include acetone, methanol and/or ethanol. The middle-boiling point material may include a material having a boiling point in the range of higher than about 100° C. to lower than about 150° C. For example, the middle-boiling point material may include xylene and/or toluene. The high-boiling point material may include a material having a boiling point equal to or higher than about 150° C. For example, the high-boiling point material may include butyl cellosolve and/or cellosolve acetate.

The smell-diffusing material may include a gaseous or liquid perfume.

The microcapsules 10a, 10b and 10c may include the same smell-diffusing material, or a different smell-diffusing material. For example, all of the microcapsules 10a, 10b and 10c may include a lemon scent, jasmine scent or banana scent. Alternatively, the microcapsule 10a may include a lemon scent, the microcapsule 10b may include a jasmine scent, and the microcapsule 10c may include a banana scent.

The microcapsules 10a, 10b and 10c may include a plurality of the same smell-diffusing materials, or a plurality of different smell-diffusing materials. For example, all of the microcapsules 10a, 10b, and 10c may include a lemon scent and jasmine scent. Alternatively, the microcapsule 10a may include a lemon scent and a jasmine scent, the microcapsule 10b may include a banana scent and a strawberry scent, and the microcapsule 10c may include a pear scent and a chamomile scent.

The hydrophilic liquid may include at least one selected from the group consisting of water, alcohols, dimethylformamide, acetone, acetonitrile, chloroform, methylene chloride, N-methylpyrrolidone (NMP) and combinations thereof.

A process for preparing the microcapsules having the configurations described above will now be described.

A smell-diffusing material is added to a polymer solution and the solution is stirred to prepare an emulsion including emulsified particles dispersed therein. A cross-linking agent is slowly added to the emulsion while stirring, and the mixture is heated to a set temperature and stirred until the emulsified particles are stabilized. A hydrophilic solution of a photocatalyst precursor is added to the emulsion and the mixture is stirred until the emulsified particles are stabilized. The emulsion is heated to a set temperature such that a crosslinking reaction occurs, which results in a microcapsule-containing solution.

The apparatus configured to transfer smell information 100 may include a protective layer 111 disposed to cover the smell-diffusing cells 110a, 110b and 110c.

The protective layer 111 protects the smell-diffusing cells 110a, 110b and 110c from external damages. The protective layer 111 may include at least one selected from the group consisting of polymer membranes and Teflon.

The smell-diffusing cell array substrate 110 may be directly printed on a second electrode 109 that will be described later. For example, the second electrode 109, which has matrix-shaped grooves or stripe-shaped grooves that are parallel to each other, is prepared. A solution containing the microcapsules 10*a*, 10*b* and 10*c* may be printed onto the grooves by inkjet printing, nozzle printing or a similar technique.

The UV-emitting device 120 may be disposed at one side of the smell-diffusing cell array substrate 110 to radiate UV rays to at least one of the smell-diffusing cells 110*a*, 110*b* and 110*c* according to an externally input electrical signal.

The UV-emitting device 120 may include a substrate 101, a thin film transistor array unit, a first electrode array unit, a UV-emitting unit and a second electrode array unit.

The substrate 101 may be a transparent glass substrate including $SiO_2$ as a main component.

The thin film transistor array unit may include at least one thin film transistor 102 arrayed on the substrate 101. The thin film transistor 102 is a switching device that transmits an externally input electrical signal (i.e., smell information signal) to an organic light-emitting layer 107, or that blocks the electrical signal. For example, the thin film transistor 102 may have a configuration identical or similar to a thin film transistor 210 of FIG. 3.

A planarization layer 105 may be disposed to cover at least one portion of the thin film transistor 102.

The first electrode array unit may be disposed on the thin film transistor array unit and electrically connected to the thin film transistor array unit. For example, the first electrode array unit may include at least one first electrode 103 disposed on each thin film transistor 102. Each thin film transistor 102 may be electrically connected to each first electrode 103, respectively. The first electrode 103 may include an indium tin oxide (ITO).

A smell-diffusing cell defining layer 106 may be disposed to cover at least one portion of the first electrode 103. The smell-diffusing cell defining layer 106 may be formed of an insulating material.

The UV-emitting unit may be disposed on the first electrode array unit. For example, the UV-emitting unit may include at least one organic light-emitting layer 107 that is disposed on (or above) each of the first electrodes 103. The organic light-emitting layer 107 emits UV rays in response to a voltage applied thereto. The organic light-emitting layer 107 may include at least one selected from the group consisting of a low molecular weight OLED material, a high molecular weight OLED material, a quantum dot (QD) LED material, an inorganic LED material and combinations thereof.

Materials used to form the organic light-emitting layer 107 may have the following characteristics: (i) high fluorescence quantum yield at solid state, (ii) high mobility of electrons and holes, (iii) high degradation resistance during vacuum deposition, and (iv) good capability to form a uniform film having a stable structure.

The organic light-emitting layer 107 may include at least one product manufactured by Nichia Chemical Industries selected from the group consisting of NCCU033 emitting light with a wavelength of 365 nm, a product emitting light with a wavelength of 265 nm, a product emitting light with a wavelength of 280 nm, a product emitting light with a wavelength of 310 nm, and a product emitting light with a wavelength of 340 nm.

The organic light-emitting layer 107 may include at least one product selected from the group consisting of a product emitting light with a wavelength of 365 nm, a product emitting light with a wavelength of 265 nm, a product emitting light with a wavelength of 280 nm, a product emitting light with a wavelength of 310 nm, and a product emitting light with a wavelength of 340 nm.

The organic light-emitting layer 107 may include at least one selected from the group consisting of 4,4'-bis(9-carbazolyl)biphenyl, 2-(4-biphenylyl)-5-(4-tert-butylphenyl)-1,3,4-oxadiazole, N,N'-8-diphenyl-N,N'-bis-3-methylphenyl)-(1,1'-biphenyl)-4,4'-diamine (TPD), GaN, poly-phenylenevinylene (PPV), poly(3-alkylthiophene), APFO-Green2, PFDTBT, PCPDTB and derivatives thereof.

Poly(3-hexylthiophene) (P3HT) (which is an example of a poly(3-alkylthiophene)), MEH-PPV and MDMO-PPV (which are examples of derivatives of PPV), APFO-Green2, PFDTBT, and PCPDTB are shown below.

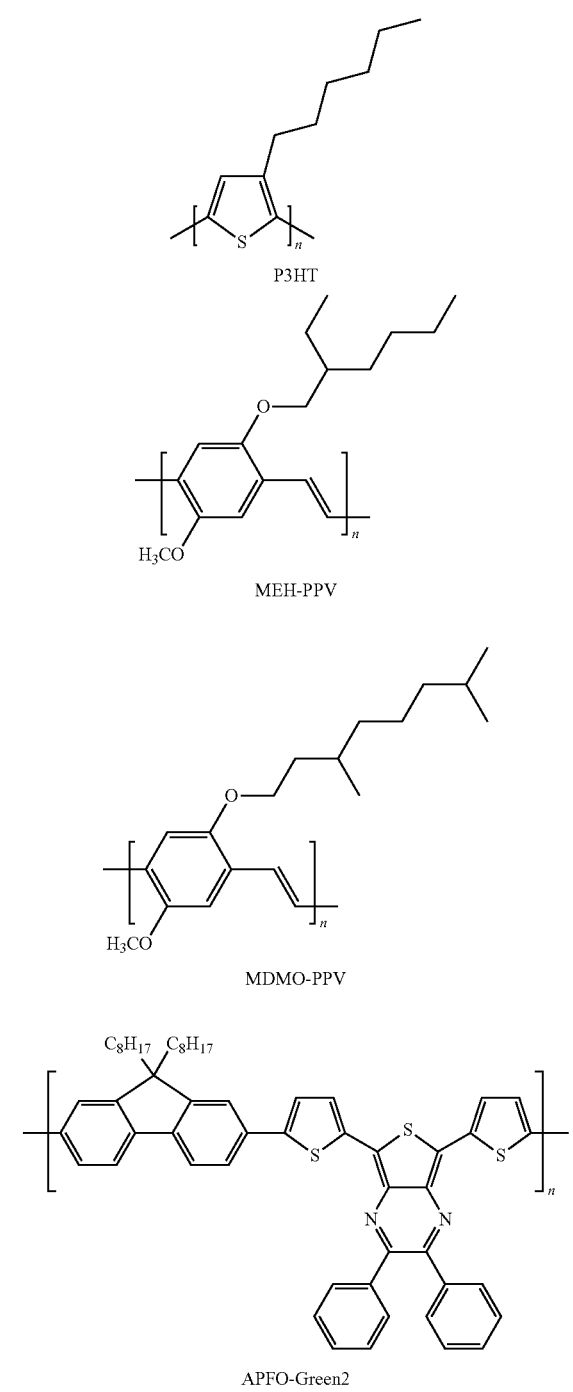

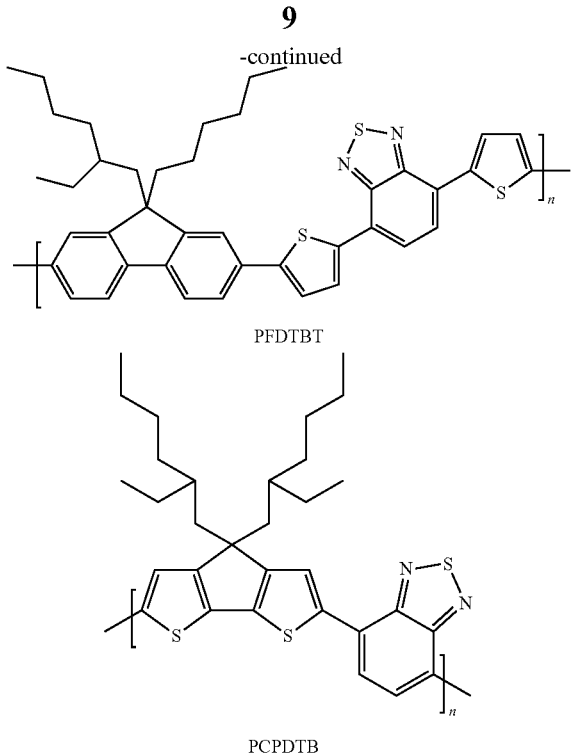

PFDTBT

PCPDTB

At least one hole transport layer 104 may be interposed between the organic light-emitting layer 107 and the first electrode 103 corresponding to the organic light-emitting layer 107 in the UV-emitting unit. The hole transport layer 104 may include a zinc phthalocyanine (ZnPc) and/or copper phthalocyanine (CuPc) represented by the following Formulae 1-1 and 1-2.

FORMULA 1-1

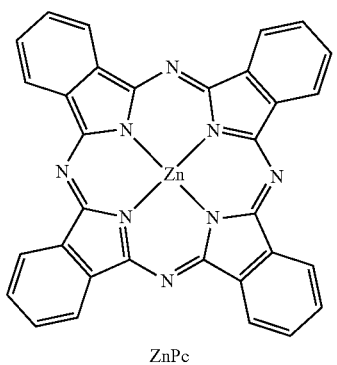

ZnPc

FORMULA 1-2

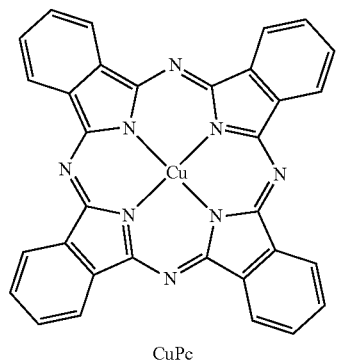

CuPc

Banks 108 may be disposed between the organic emission layers 107.

The second electrode array unit may be disposed on the UV-emitting unit. For example, the second electrode array unit may include at least one second electrode 109. The second electrode 109 may include a CsF/Al layer and/or TPD/Ag layer. The polarity of the second electrode layer 109 may be opposite to that of the first electrode layer 103 when a voltage is applied.

The apparatus for transferring smell information 100 may have the first electrode 103/hole transport layer 104/organic light-emitting layer 107/second electrode 109 structure. For example, the apparatus for transferring smell information 100 may have a [ITO]/[CuPc]/[4,4'-bis(9-carbazolyl)biphenyl/2-(4-biphenylyl)-5-(4-tert-butylphenyl)-1,3,4-oxadiazole]/[CsF/Al] structure, or a [ITO]/[CuPcy]/[at least one TPD/GaN layer]/[TPD/Ag] structure.

The apparatus for transferring smell information 100 may have a similar configuration to known TFT-OLEDs, except for the smell-diffusing cell array substrate 110 and the organic light-emitting layer 107. For example, the smell-diffusing cell defining layer 106 may correspond to a pixel defining layer of a TFT-OLED. Thus, descriptions of the apparatus for transferring smell information 100, except for the smell-diffusing cell array substrate 110 and the organic light-emitting layer 107, will be omitted herein.

Figure 2:
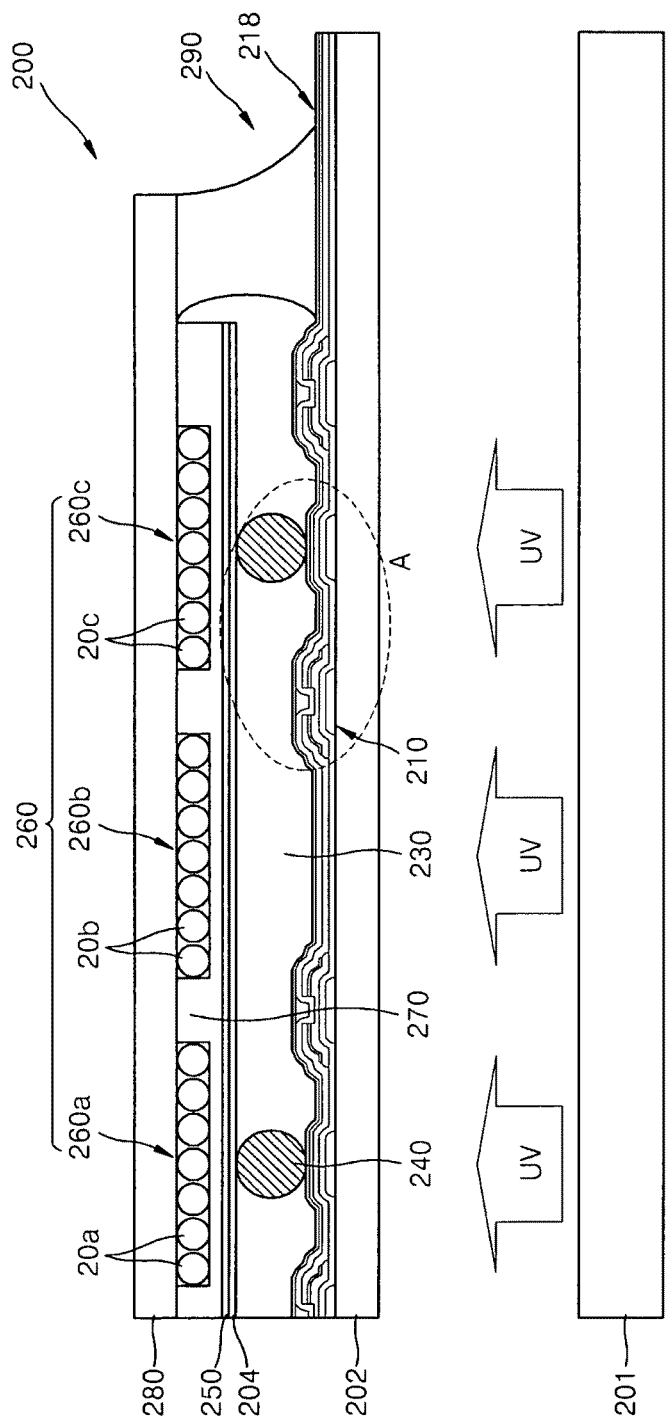
FIG. 2 is a cross-sectional view of an apparatus configured to transfer smell information according to example embodiments.
Figure 3:
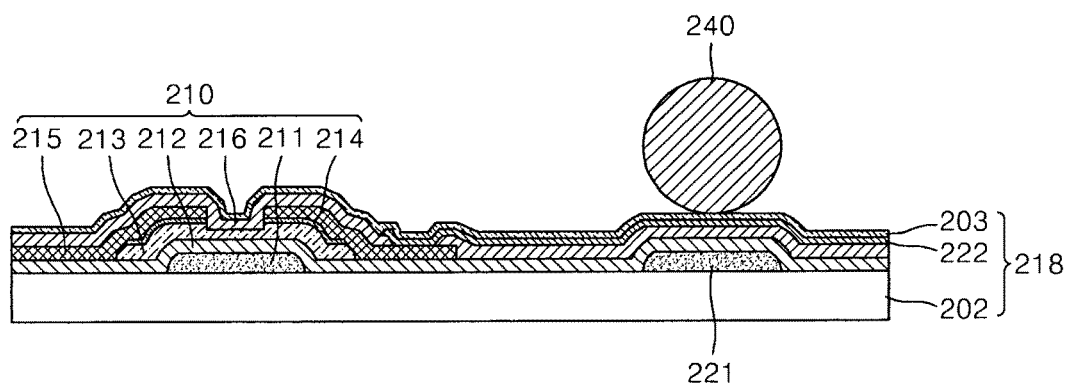
FIG. 3 is an enlarged view of portion A of FIG. 2.

FIG. 2 is a cross-sectional view of an apparatus configured to transfer smell information according to example embodiments. FIG. 3 is an enlarged view of portion A of FIG. 2.

Referring to FIG. 2, the apparatus for transferring smell information 200 according to example embodiments includes a smell-diffusing cell array substrate 260 and a UV-emitting device 290.

The smell-diffusing cell array substrate 260 may include at least one smell-diffusing cell 260a, 260b and 260c and at least one black matrix 270 disposed between the smell-diffusing cells 260a, 260b and 260c.

Each of the smell-diffusing cells 260a, 260b and 260c may respectively include at least one microcapsule 20a, at least one microcapsule 20b and at least one microcapsule 20c, respectively. In FIG. 2, three smell-diffusing cells 260a, 260b and 260c are shown for descriptive convenience. However, example embodiments are not limited thereto. For example, the smell-diffusing cell array substrate 260 may include one or two smell-diffusing cells, or four or more smell-diffusing cells.

The smell-diffusing cells 260a, 260b and 260c may be directly disposed on a common electrode 250 as shown in FIG. 2, or disposed on a separate substrate (not shown). When the smell-diffusing cells 260a, 260b and 260c are disposed on the common electrode 250, the common electrode 250, the smell-diffusing cell array substrate 260, and, optionally, a protective layer 280 may be designated as a collective term "smell-diffusing cell array substrate". Alternatively, when the smell-diffusing cells 260a, 260b and 260c are disposed on the separate substrate, the substrate and the smell-diffusing cell array substrate 260, and, optionally, a protective layer 280 may be designated as a collective term "smell-diffusing cell array substrate". The smell-diffusing cell array substrate may be replaced when the lifespan thereof expires.

The apparatus for transferring smell information 200 may include the protective layer 280 to cover the smell-diffusing cells 260a, 260b and 260c.

The configurations and functions of the microcapsules 20a, 20b and 20c and the protective layer 280 are similar to those of the microcapsules 10a, 10b and 10c and the protective layer 111 described in FIG. 1. Thus, descriptions thereof will not be repeated herein.

The UV-emitting device 290 may include an UV light source 201, a thin film transistor array substrate 218, a common electrode 250, a pair of alignment layers 203 and 204, a liquid crystal 230 and a spacer 240.

The UV light source may be an UV lamp.

The thin film transistor array substrate 218 may be exposed to UV rays emitted from the UV light source 201. The thin film transistor array substrate 218 may include a substrate 202, at least one thin film transistor 210, and at least one pixel electrode 222. The thin film transistor 210 is a switching device that transmits an externally input electrical signal (i.e., a smell information signal) to the liquid crystal 230, or blocks the electrical signal. For example, the thin film transistor 210 may have a configuration identical or similar to that of FIG. 3.

Referring to FIG. 3, the thin film transistor 210 may include a gate electrode 211, a gate insulating layer 212, an activation layer of a-Si:H 213, an Ohm contact layer of n+a-Si:H 214, a source 215, a drain 216 and a protective layer (not shown). Any transistor having various configurations other than the thin film transistor 210 may also be used for the apparatuses for transferring smell information 100 and 200 according to example embodiments.

In addition, a Cs electrode 221 may be disposed on the substrate 202 to be spaced apart from the thin film transistor 210.

The alignment layer 203 is disposed on the thin film transistor array substrate 218 and aligns the liquid crystal 230 in a single direction with the alignment layer 204 that will be described later.

The common electrode 250 is disposed on the smell-diffusing cell array substrate 260 so as to face the at least one pixel electrode 222. The common electrode 250 may be formed of indium tin oxide (ITO).

The alignment layer 204 may be disposed on the common electrode 250.

The liquid crystal 230 may block, or transmit, the UV rays emitted from the UV light source 201 to control the smell-diffusing cells 260a, 260b and 260c of the smell-diffusing cell array substrate 260.

The spacer 240 maintains constant the space between the thin film transistor array substrate 218 and the smell-diffusing cell array substrate 260.

The apparatus for transferring smell information 200 as described above may have a similar configuration as known TFT-OLEDs, except for the smell-diffusing cell array substrate 260 and the UV light source 201. Thus, descriptions of the apparatus for transferring smell information 200, except for the smell-diffusing cell array substrate 260 and the UV light source 201, will be omitted herein.

Figure 4:
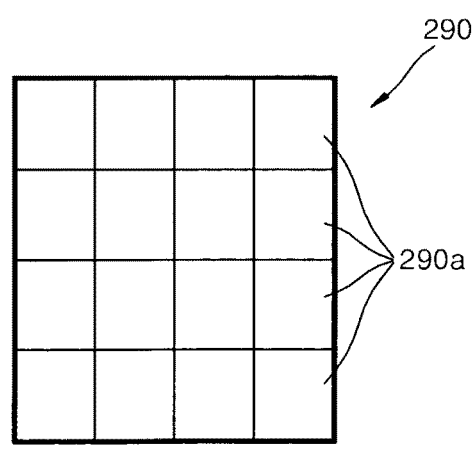
FIG. 4 is a simplified plan view of light-emitting cells of a UV-emitting device according to example embodiments.

FIG. 4 is a simplified plan view of light-emitting cells of a UV-emitting device according to example embodiments.

Referring to FIG. 4, a UV light-emitting device 290 includes at least one light-emitting cell 290a. UV rays may be emitted from the at least one light-emitting cell 290a according to an externally input electrical signal. In FIG. 4, the light-emitting cells 290a are arrayed in a matrix shape, but are not limited thereto. The light-emitting cells 290a may be arrayed in various shapes (e.g., in stripes parallel to each other).

Figure 5:
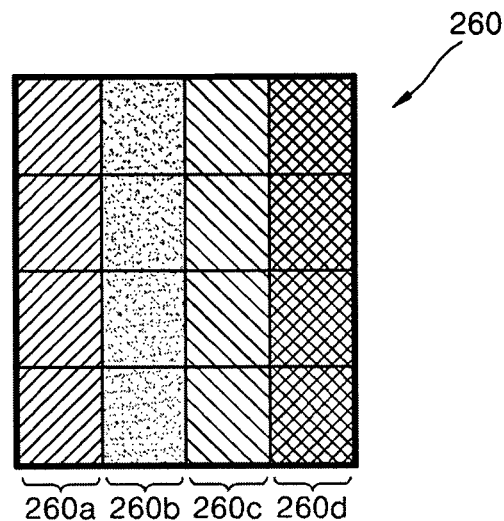
FIG. 5 is a simplified plan view of a smell-diffusing cell array substrate of a smell-diffusing cell array substrate according to example embodiments.

FIG. 5 is a simplified plan view of a smell-diffusing cell array substrate of a smell-diffusing cell array substrate according to example embodiments.

Referring to FIG. 5, the UV rays emitted from at least one of the light-emitting cells 290a shown in FIG. 4 are incident upon at least one of the smell-diffusing cells 260a, 260b, 260c and 260d corresponding to the light-emitting cells 290a to form at least one crack or hole 31c in the shell of the microcapsules 20a, 20b and 20c shown in FIG. 2 and other microcapsules not shown. As such, smell may be diffused from at least one smell-diffusing cell exposed to the UV rays of the smell-diffusing cells 260a, 260b, 260c and 260d. In FIG. 5, the light-emitting cells 260a, 260b, 260c and 260d are arrayed in stripes that are parallel to each other, but are not limited thereto. The light-emitting cells 290a may be arrayed in various shapes (e.g., in a matrix shape).

An electronic device according to example embodiments may include the apparatus for transferring smell information 100 or 200 described above. The electronic device may be selected from the group consisting of an image display device, a wire/wireless phone, a computer, a radio, an MP3, a digital multimedia broadcast (DMB), a game machine, a navigator, a mobile telecommunication device or a similar device.

The electronic device may be used for the following purposes: (i) transfer smells (e.g., smells of cooking and landscape) via air broadcasting, (ii) transfer specific smells via video communications (flower delivery, love letters), (iii) transfer smells from one image display device to another image display device, (iv) transfer smells to observers by constantly diffusing smells via a large advertisement display, (v) reproduce smells while watching a VTR, (vi) transfer smells (e.g., smells of fruits, instant foods or coffee) to customers in mass retailers for marketing, and (vii) transfer smells from one wireless phone to another wireless phone.

Hereinafter, example embodiments will be described in detail with reference to the following examples. However, these examples are not intended to limit the purpose and scope of the one or more embodiments of the disclosure.

EXAMPLES

Example 1

Preparation of Microcapsule 200-g of a polyvinyl pyrrolidone aqueous solution (PVP10, Aldrich) was added to a 1 L reactor equipped with a stirrer, and the pH of the solution was set to 4.7 using a phosphate buffer saline (PBS). Then, 15-g of a strawberry flavor (Strawberry FI.O, CPL AROMAS, Britain) was added to the reactor, and the reactor was stirred at 1500-rpm for 20 minutes to prepare an emulsion in which micro particles are dispersed. 5-g of melamine and 10.28-g of 37 wt % formalin aqueous solution were added to a separate beaker, and triethanolamine was added thereto to set the pH of the mixture at 8.2. Then, the mixture was heated to 60° C. to obtain a transparent solution. 25-g of water was added thereto to prepare a cross-linking agent solution. The cross-linking agent solution was added to the emulsion at 25° C., and the mixture was heated to 42° C. and stirred at 1500-rpm until the emulsified particles are stabilized. Then, titaniumisopropoxide, isopropyl alcohol, acetylacetone and water were added to the reactor at a molar ratio of 1:5:0.5:5, and the mixture was stirred at 1500-rpm until the emulsified particles are stabilized. After the emulsified particles were stabilized, the mixture was subjected to a cross-linking reaction at 60° C. at 2500 rpm for 2 hours while inhibiting the generation of bubble to obtain a microcapsule-containing solution.

EVALUATION EXAMPLES

Evaluation Example 1

Identification of Preparation of Microcapsule

A scanning electron microscopic (SEM) image of the microcapsule-containing solution prepared according to Example 1 was obtained in order to identify whether the microcapsule is contained in the microcapsule-containing solution.

Figure 7:
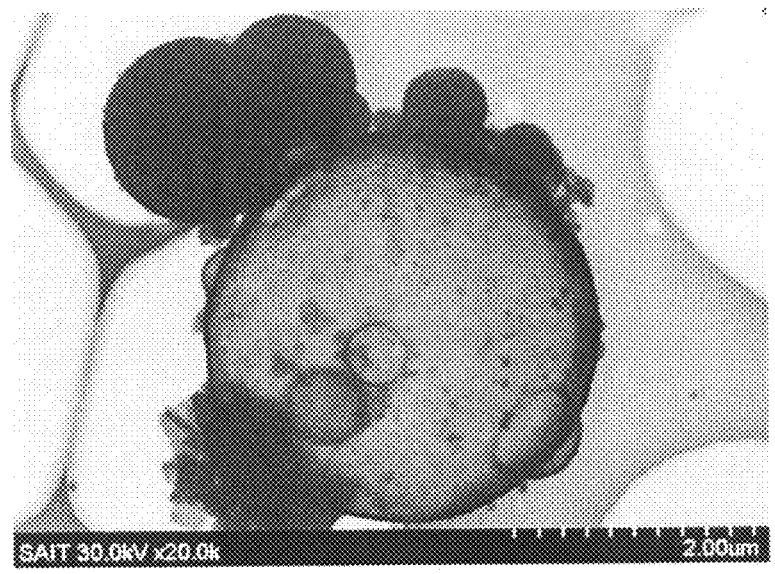
FIG. 7 is a scanning electron microscopic (SEM) image of a microcapsule synthesized according to example embodiments.

FIG. 7 is a SEM image of a microcapsule synthesized according to example embodiments.

Referring to FIG. 7, it was identified that spherical microcapsules are prepared.

Evaluation Example 2

Evaluation of Performance of Microcapsule

Figure 8:
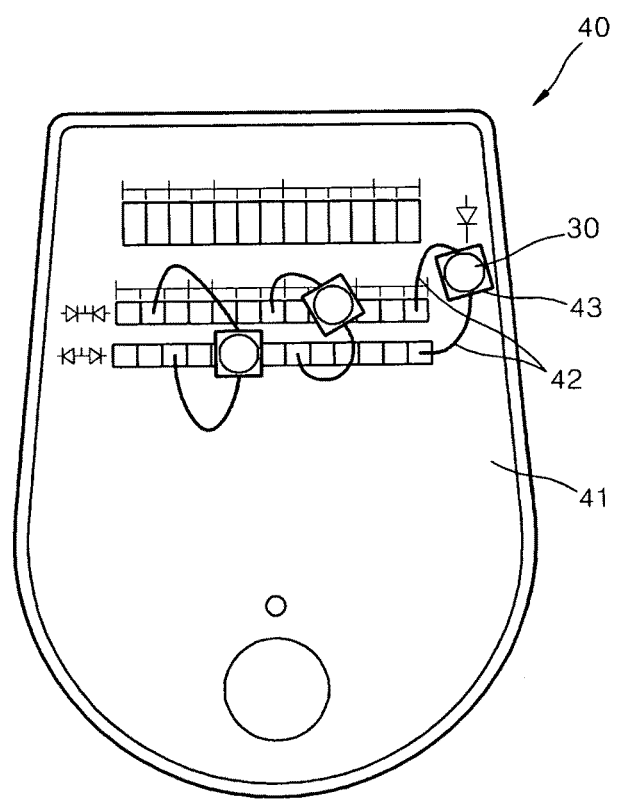
FIG. 8 illustrates a device for testing performance of a microcapsule prepared according to example embodiments.

FIG. 8 illustrates a device for testing performance of a microcapsule prepared according to example embodiments.

Performance of the microcapsule prepared according to Example 1 was evaluated using a test device 40 shown in FIG. 8.

Referring to FIG. 8, three UV LED cells 43 are each connected to a LED tester (self-manufactured) 41 via wires 42 to allow a current to flow through the UV LED cells 43. Then, the microcapsule-containing solution prepared according to Example 1 was coated on each of the UV LED cells 43. A switch of the LED Tester 41 was turned on, and diffusion of the strawberry flavor from the microcapsule-containing solution coated on each of the UV LED cell 43 was measured via smell (i.e., by nose). As a result, it was identified that the strawberry flavor was diffused when the switch of the LED Tester 41 was turned on, and the strawberry flavor gradually disappeared when the switch of the LED Tester 41 was turned off.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A smell-diffusing cell array substrate, comprising:
   at least one smell-diffusing cell that includes a microcapsule having a core-shell structure,
   wherein a shell of the microcapsule includes a wall material and a photocatalyst dispersed in the wall material, and
   a core of the microcapsule includes a smell-diffusing material and a hydrophilic liquid,
   wherein the smell-diffusing cell array substrate is configured to control diffusion of a smell of the smell-diffusing material through the shell by changing exposure of the at least one smell-diffusing cell to UV rays such that hydrophilicity of the photocatalyst increases as exposure of the at least one smell-diffusing cell to the UV rays increases, and the hydrophilicity of the photocatalyst decreases when the exposure of the at least one smell-diffusing cell to the UV rays is stopped; and
   wherein when UV rays are radiated on the microcapsule, the photocatalyst is dissolved in the hydrophilic liquid to form a crack in the shell through which the smell of the smell-diffusing material is diffused, and when UV radiation is stopped, the hydrophilicity of the photocatalyst dissolved in the hydrophilic liquid decreases and the photocatalyst is precipitated such that the crack in the shell is at least partially filled with the precipitated photocatalyst.

2. The smell-diffusing cell array substrate of claim 1, wherein the wall material includes at least one selected from the group consisting of a metal, an inorganic material, an organic material and combinations thereof.

3. The smell-diffusing cell array substrate of claim 2, wherein the wall material includes at least one selected from the group consisting of gold, silver, silicon derivatives, protein, polyphosphate, polysaccharide, gum Arabic, alginate, chitosan, carrageenan, pectin, water-soluble polymer, cellulose, cellulose derivatives and combinations thereof.

4. The smell-diffusing cell array substrate of claim 1, wherein the photocatalyst includes at least one selected from the group consisting of titanium oxide, zirconium oxide, zinc oxide, vanadium oxide, tin oxide and derivatives thereof.

5. The smell-diffusing cell array substrate of claim 1, wherein the smell-diffusing material includes at least one selected from the group consisting of a low-boiling point material having a boiling point equal to or lower than 100° C., a middle-boiling point material having a boiling point of higher than 100° C. and lower than 150° C., a high-boiling point material having a boiling point equal to or higher than 150° C. and combinations thereof.

6. The smell-diffusing cell array substrate of claim 5, wherein the low-boiling point material is one selected from the group consisting of acetone, methanol, ethanol and combinations thereof,
   the middle-boiling point material is one selected from the group consisting of xylene, toulene and combinations thereof, and
   the high-boiling point material is one selected from the group consisting of butyl cellosolve, cellosolve acetate and combinations thereof.

7. The smell-diffusing cell array substrate of claim 1, wherein the smell-diffusing material includes a perfume.

8. The smell-diffusing cell array substrate of claim 1, wherein the hydrophilic liquid includes at least one selected from the group consisting of water, alcohols, dimethylformamide, acetone, acetonitrile, chloroform, methylene chloride, N-methylpyrrolidone (NMP) and combinations thereof.

9. An apparatus configured to transfer smell information, the apparatus comprising:
   the smell-diffusing cell array substrate according to claim 1; and
   an ultra-violet (UV)-emitting device at one side of the smell-diffusing cell array substrate, wherein the UV-emitting device is configured to radiate the UV rays to the at least one smell-diffusing cell using an externally input electrical signal.

10. The apparatus of claim 9, wherein the UV-emitting device includes:
a thin film transistor array unit including at least one thin film transistor on a substrate;
a first electrode array unit on the thin film transistor array unit and electrically connected to the at least one thin film transistor array unit;
an UV-emitting unit on the first electrode array unit; and
a second electrode array unit on the UV-emitting unit.

11. The apparatus of claim 9, wherein the UV-emitting device includes at least one organic light-emitting layer, and
the at least one organic light-emitting layer includes at least one selected from the group consisting of a low molecular weight organic light-emitting diode (OLED) material, a high molecular weight OLED material, a quantum dot (QD) LED material, an inorganic LED material and combinations thereof.

12. The apparatus of claim 10, wherein the smell-diffusing cell array substrate is printed on the second electrode array unit.

13. The apparatus of claim 9, wherein the UV-emitting device includes:
an UV light source;
a thin film transistor array substrate exposed to the UV rays emitted from the UV light source, the thin film transistor array substrate including at least one pixel electrode;
at least one common electrode on the smell-diffusing cell array substrate, the at least one common electrode facing the at least one pixel electrode; and
a liquid crystal between the thin film transistor array substrate and the at least one common electrode.

14. The apparatus of claim 9, further comprising a protective layer covering the smell-diffusing cell array substrate.

15. An electronic device, comprising the apparatus configured to transfer the smell information according to claim 9.

16. The electronic device of claim 15, wherein the electronic device is selected from the group consisting of an image display device, a wire/wireless phone, a computer, a radio, an MP3, a digital multimedia broadcast (DMB), a game machine, a navigator and a mobile telecommunication device.

* * * * *